US009781736B2

United States Patent
Leroux et al.

(10) Patent No.: US 9,781,736 B2
(45) Date of Patent: Oct. 3, 2017

(54) OFFLOADING OF CONTROLLING ACROSS ACCESS NODES

(71) Applicant: Huawei Technologies Co., Ltd., Shenzhen (CN)

(72) Inventors: Philippe Leroux, Ottawa (CA); Aaron Callard, Ottawa (CA); Nimal Gamini Senarath, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 14/668,644

(22) Filed: Mar. 25, 2015

(65) Prior Publication Data

US 2016/0286568 A1 Sep. 29, 2016

(51) Int. Cl.
*H04W 72/12* (2009.01)
*H04L 5/00* (2006.01)
(Continued)

(52) U.S. Cl.
CPC .......... *H04W 72/1231* (2013.01); *H04L 1/00* (2013.01); *H04L 5/0073* (2013.01); *H04L 47/60* (2013.01); *H04L 47/782* (2013.01); *H04L 67/1095* (2013.01); *H04W 52/146* (2013.01); *H04W 52/243* (2013.01); *H04W 72/12* (2013.01);
(Continued)

(58) Field of Classification Search
CPC . H04W 72/12; H04W 72/1231; H04W 52/04; H04W 88/02; H04W 88/08; H04W 88/12; H04W 28/18; H04L 1/00; H04L 47/60; H04L 47/782; H04L 51/0073
See application file for complete search history.

(56) References Cited

U.S. PATENT DOCUMENTS

2007/0097939 A1* 5/2007 Nylander ............ H04L 61/1511 370/338
2012/0252423 A1 10/2012 Brisebois et al.
(Continued)

FOREIGN PATENT DOCUMENTS

WO 2014133589 A1 9/2014

OTHER PUBLICATIONS

Diehm, F., et al., "A Low-Complexity Algorithm for Uplink Scheduling in Cooperative Cellular Networks with a Capacity-Constrained Backhaul Infrastructure," Global Telecommunications Conference, Nov. 30, 2009-Dec. 4, 2009, pp. 1-6, IEEE.
(Continued)

*Primary Examiner* — Habte Mered
(74) *Attorney, Agent, or Firm* — Slater Matsil, LLP (57) ABSTRACT

Inter-cell interference can be reduced by re-assigning uplink scheduling responsibilities for a user equipment (UE) from a controller associated with a serving access point (AP) to a controller associated with a neighboring AP, as the controller associated with the neighboring AP may have better access to channel information corresponding to interference experienced by the neighboring AP as a result of uplink transmissions from the UE. After the re-assignment, the controller associated with the neighboring AP may independently schedule an uplink transmission parameter (e.g., a transmit power level, a modulation coding scheme level and/or a precoder) of the UE in a manner that mitigates inter-cell-interference in the neighboring cell.

22 Claims, 4 Drawing Sheets (51) Int. Cl.

| | | |
|---|---|---|
| H04L 12/869 | (2013.01) | |
| H04L 12/911 | (2013.01) | |
| H04L 29/08 | (2006.01) | |
| H04L 1/00 | (2006.01) | |
| H04W 52/14 | (2009.01) | |
| H04W 52/24 | (2009.01) | |
| H04W 88/02 | (2009.01) | |
| H04W 88/08 | (2009.01) | |
| H04W 88/12 | (2009.01) | |
| H04W 28/18 | (2009.01) | |

(52) U.S. Cl.
CPC ............ *H04W 28/18* (2013.01); *H04W 88/02* (2013.01); *H04W 88/08* (2013.01); *H04W 88/12* (2013.01)

(56) References Cited

U.S. PATENT DOCUMENTS

| | | |
|---|---|---|
| 2012/0289170 A1 | 11/2012 | Li et al. |
| 2013/0017826 A1* | 1/2013 | Bergquist .............. H04W 12/08 455/426.1 |
| 2013/0242844 A1 | 9/2013 | Singh et al. |
| 2013/0279478 A1* | 10/2013 | De Bruin .......... H04W 36/0083 370/331 |
| 2014/0003274 A1* | 1/2014 | Clerckx .............. H04L 25/0204 370/252 |
| 2015/0078177 A1* | 3/2015 | Buckley .............. H04W 72/082 370/252 |
| 2015/0180561 A1* | 6/2015 | Jindal ............... H04L 25/03898 375/267 |
| 2015/0358982 A1* | 12/2015 | Jeon ...................... H04J 11/005 370/252 |
| 2015/0373732 A1* | 12/2015 | Davydov ................. H04L 5/00 370/329 |

OTHER PUBLICATIONS

Marsch, P., et al., "A Decentralized Optimization Approach to Backhaul-Constrained Distributed Antenna Systems," Mobile and Wireless Communications Summit, Jul. 1-5, 2007, pp. 1-5, IEEE.

* cited by examiner

OFFLOADING OF CONTROLLING ACROSS ACCESS NODES

TECHNICAL FIELD

The present invention relates to the field of wireless communications, and, in particular embodiments, to a system and method for offloading of controlling across access nodes.

BACKGROUND

Traditionally, radio access links between access points (APs) and user equipment (UEs) have been the bottleneck that constrains throughput between the UE and the core network, as data rates over backhaul network connection between the radio access network (RAN) and the core network are typically many times faster than data rates over the corresponding wireless access links. However, next-generation network architectures having densely deployed cells may achieve significant increases in throughput, as well as share backhaul network resources amongst greater numbers of APs. As a result, the capacity gap between radio access links and backhaul network connection may be reduced in some network-generation network implementations, resulting in situations where data forwarding rates are constrained by the backhaul network connection, rather than the radio access link.

SUMMARY OF THE INVENTION

Technical advantages are generally achieved, by embodiments of this disclosure which describe offloading of controlling across access node.

In accordance with an embodiment, a method for offloading scheduling responsibilities is provided. In this example, the method comprises identifying a served user equipment (UE) assigned to a serving AP. Uplink transmissions from the served UE to the serving AP interfere with, or are projected to interfere with, wireless signals communicated by a neighboring AP. The method further comprises determining that at least a portion of uplink scheduling responsibilities for the served UE have been re-assigned from a first controller associated with the serving AP to a second controller associated with the neighboring AP. The method further comprises scheduling a parameter of an uplink transmission from the served UE to the serving AP to mitigate interference experienced by the neighboring AP as a result of the uplink transmission. The parameter of the uplink transmission is independently scheduled by the second controller without the first controller participating in scheduling of the parameter. An apparatus for performing this method is also provided.

In accordance with another embodiment, a method for uplink communications is provided. In this example, the method comprises receiving a first scheduling assignment from a first controller, performing a first uplink transmission to the serving AP over the radio interface in accordance with the first scheduling assignment during a first period, and receiving a second scheduling assignment from a second controller. The second scheduling assignment indicates a parameter that is independently scheduled by the second controller without the first controller participating in scheduling of the parameter. The method further comprises performing a second uplink transmission over the radio interface in accordance with the parameter during a second period. The second uplink transmission is received at least by the serving AP. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In densely deployed wireless networks, uplink scheduling may attempt to maximize the data rate of uplink transmissions in a serving cell, while mitigating inter-cell interference in neighboring cells. This may be complicated in distributed scheduling scenarios, where different controllers schedule transmissions in different cells. For example, a distributed controller allocating transmissions in a serving cell may have limited access to control information (e.g., channel state information (CSI)) corresponding to a neighboring cell, and consequently may find it difficult to determine which transmission parameters would provide acceptable interference levels in the neighboring cell.

Aspects of this disclosure re-assign uplink scheduling responsibilities for a served UE from a controller associated with a serving cell to a controller associated with a neighboring cell such that the controller associated with the neighboring cell independently schedules an uplink transmission parameter (e.g., a transmit power level, a modulation coding scheme (MCS) level, and/or a precoder) to the served UE. This re-assignment may be advantageous because the controller associated with the neighboring cell may have better access to CSI measured in the neighboring cell, and may therefore be better situated to schedule uplink transmission parameters of the served UE that mitigate inter-cell-interference in the neighboring cell. In one example, the controller associated with the neighboring cell may schedule the uplink transmission of the served UE over radio resources are not being utilized by the neighboring AP, or are otherwise carrying signals that would experience less interference from the uplink transmission, e.g., downlink signals transmitted to UEs in the neighboring cell that are positioned far away from the served UE, etc. As another example, the neighboring controller may schedule the transmission parameters in a manner that allows the neighboring AP to decode, and isolate, the uplink transmission from other received signals in accordance with an interference cancellation technique, e.g., successive interference cancellation (SIC), etc. These and other aspects are discussed in greater detail below.

Figure 1:
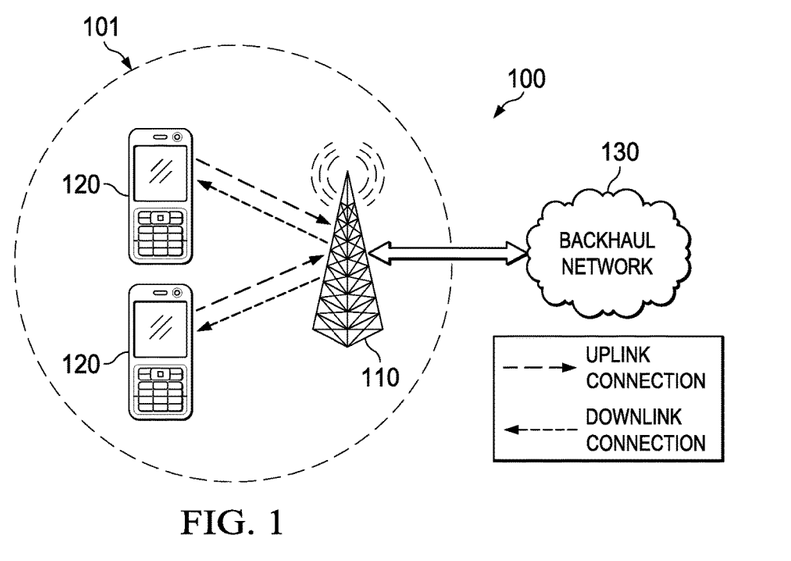
FIG. 1 illustrates a diagram of an embodiment wireless network.

Aspects of this disclosure may be implemented in wireless networks. FIG. 1 illustrates a network 100 for communicating data. The network 100 comprises an access point (AP) 110 having a coverage area 101, a plurality of mobile devices 120, and a backhaul network 130. The AP 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as user equipment (UE), a mobile station (STA), or other wirelessly enabled devices. The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
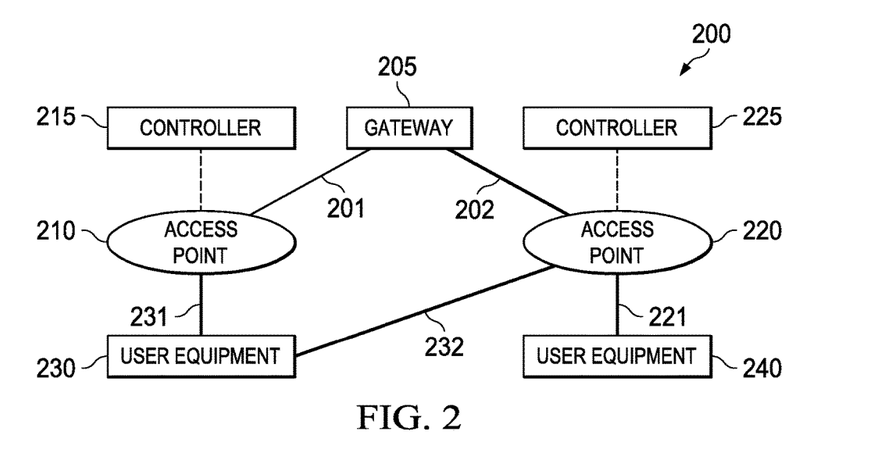
FIG. 2 illustrates a diagram of an embodiment network architecture for an offloading control method.

FIG. 2 illustrates an embodiment network architecture 200 for re-assigning scheduling responsibilities. As shown, the network architecture 200 comprises a gateway 205, controllers 215, 225, access points (APs) 210, 220, and user equipments (UEs) 230, 240. The gateway 205 communicates with the APs 210, 220 through the backhaul network connections 201, 202, respectively. In this example, the UE 230 may be served by the AP 210, and consequently the UE 230 and the AP 210 may be referred to as the served UE 230 and the serving AP 210, respectively. For similar reasons, the AP 220 may be referred to as the neighboring AP 220.

The served UE 230 may perform uplink transmissions to the serving AP 210 over the radio interface 231. Those uplink transmissions may also propagate over a radio interface 232, and ultimately produce interference at the neighboring AP 220. For example, uplink transmissions by the served UE 230 may interfere with uplink transmissions communicated from the UE 240 to the neighboring AP 220 over the radio interface 221.

The controller 215 may be associated with the AP 210, such that the controller 215 generally performs uplink scheduling for the serving AP 210. Likewise, the controller 225 may be associated with the neighboring AP 220 to the extent that the controller 215 generally performs uplink scheduling for the neighboring AP 220. The controllers 215, 225 may be deployed on the same device platform or on different device platforms, as the respective APs 210, 220.

In some situations, it may be advantageous to re-assign at least a portion of uplink scheduling responsibility of the served UE 230 from the controller 215 to the controller 225.

The phrase "re-assignment of scheduling responsibilities" for the served UE 230 from the controller 215 associated with the serving AP 210 to the controller 225 associated with the neighboring AP 220 is used loosely herein to indicate that at least a portion of scheduling responsibilities for the served UE 230 have been assigned to the controller 225. Therefore, unless otherwise specified, the phrase "re-assignment of scheduling responsibilities" for the served UE 230 from the controller 215 associated with the serving AP 210 to the controller 225 associated with the neighboring AP 220 does not imply that the controller 215 associated with the serving AP 210 previously scheduled an uplink transmission of the served UE 230. For example, in some embodiments, the aforementioned "re-assignment of scheduling responsibility" occurs prior to the served UE 230 ever performing an uplink transmission to the served AP 220. In such an example, the re-assignment may occur during link-setup/ discovery upon determining that that uplink transmissions from the served UE 230 to the serving AP are projected to interfere with signals communicated by the neighboring AP 220. The projection may be based on a non-scheduled transmission (e.g., link-setup/discovery message) of the served UE 230. In other embodiments, the re-assignment of scheduling responsibility occurs between uplink transmissions of the served UE 230. For example, the served UE 230 may perform a first uplink transmission to the serving AP 210 that is scheduled by the controller 215. The first uplink transmission may produce a threshold level of interference at the neighboring AP 220, which may trigger the re-assignment of scheduling responsibilities for the served UE 230 from the controller 215 to the controller 225.

The re-assignment of scheduling responsibilities may be triggered by different network devices. For example, one of the controllers 215, 225 may request that scheduling responsibilities for the served UE 230 be transferred to the controller 225. The request may be exchanged between the controllers 215, 225, or between one of the controllers 215, 225 and a third party component, e.g., a co-coordination function or central entity responsible for assigning/re-assigning scheduling responsibilities between controllers. The request may include various information, including the reason for requesting the re-assignment of scheduling responsibilities. In other embodiments, the re-assignment is triggered unilaterally by a third party component, e.g., a co-coordination function or central entity responsible for assigning/re-assigning scheduling responsibilities between controllers.

The re-assignment of scheduling may be triggered by exchanging control signaling (e.g., requests, instructions, etc.) between the controllers 215, 225 and/or a central controller. For example, the controller 215 may send a re-assignment request/indication to the controller 225, or vice-versa, to trigger the re-assignment of scheduling responsibilities. Alternatively, a central controller may communicate a re-assignment instructions to one or both of the controllers 215, 225 to trigger the re-assignment of scheduling responsibilities. As discussed above, the re-assignment of uplink scheduling responsibility may be triggered when an uplink transmission of the served UE 230 interferes with, or is projected to interfere with, wireless signals communicated by the neighboring AP 220, e.g., the measured or projected level of inter-cell-interference exceeds a threshold. Other criteria may also trigger the transfer of scheduling responsibility, such as the amount of available bandwidth over the backhaul network connections 201, 202, loading of the APs 210, 220, available resources of the APs 210, 220, spectral efficiency of the wireless network, etc. For example, if the bandwidth on the backhaul connection 201 is constrained, then it may be unable to support high data rates over the serving link 231. In such cases, a network device (e.g., the controller 215, a central controller, etc.) may trigger at least some scheduling responsibilities to be re-assigned to the controller 225 in order to reduce inter-cell-interference. As another example, if there is a disparity in available resources at the APs 210, 220 (e.g., the AP 220 has fewer available resources that need to managed efficiently), then a network device (e.g., the controller 225, a central controller, etc.) may trigger the reassignment of at least some scheduling responsibilities to the controller 225. This may allow the controller 225 to select resources (and/or other parameters) over which to communicate an uplink transmission from the UE 230 to the AP 210 in a manner that mitigates interference over the limited available resources of the AP 220. As yet another example, a network device (e.g., a central controller, etc.) may trigger the reassignment of at least some scheduling responsibilities to the controller 225 when reducing inter-cell-interference in the neighboring cell will improve the spectral efficiency of the wireless network, e.g., even at the expense of reduced throughput over access link 231. In some embodiments, a cost function is used to determine when to re-assign uplink scheduling responsibilities. The cost function may include various components, including an interference component, a spectral efficiency component, and an available bandwidth component. The spectral efficiency component may correspond to a spectral efficiency over a wireless network that includes both the serving cell and base cell. The available bandwidth component may correspond to the amount of bandwidth available to the respective APs. The cost function may trigger the re-assignment of scheduling responsibilities when a cost value exceeds a threshold. In some embodiments, the cost function may include hysteresis parameters to prevent scheduling responsibilities form being re-assigned too frequently. The cost function may also include parameters related to the loading of APs relative to available resources (e.g., bandwidth availabilities, backhaul resource availability, processing capacities) and/or AP capabilities (e.g., MIMO capabilities, processing capabilities, etc.).

After being re-assigned scheduling responsibilities of the served UE 230, the controller 225 may independently assign one or more uplink scheduling parameters (e.g., an MCS level, a transmit power level, a precoder, etc.) to the served UE 230. The uplink scheduling paramaters may be communicated through a control channel (e.g., a physical downlink control channel (PDCCH) or some other type of signaling, e.g., higher layer signaling, etc. The assigned uplink scheduling parameters may be used by the served UE 230 when performing uplink transmissions to the serving AP 210 over the radio interface 231. In an embodiment, one or more of a transmit power level, precoder, MCS level, and resource assignment may be communicated from the controller 225 to the served UE 230 to mitigate interference experienced by the AP 220 as a result of those uplink transmissions.

In some embodiments, the controller 225 schedules the uplink transmission of the served UE 230 in a manner that avoids interfering with signals communicated by the AP 220. For example, the controller 225 may schedule the uplink transmission over resources that are not being used by the AP 220. As another example, the controller 225 may schedule the uplink transmission over resources that are carrying downlink transmissions to a UE that is positioned relatively far from the served UE 230, e.g., a UE on the other-side of the neighboring cell, etc. As yet another example, the controller 225 may reduce a transmit power of the uplink transmission of the served UE 230, or assign a precoder that directs a beam of the uplink transmissions of the served UE 230 away from a spatial location of the AP 220.

In other embodiments, the controller 225 may schedule the uplink transmission of the served UE 230 in a manner that allows the AP 220 to isolate interference resulting from those uplink transmissions from received signals (e.g., an uplink transmission from the UE 240) using an interference cancellation technique, e.g., SIC, etc. For example, the controller 225 may assign uplink transmission parameters (e.g., MCS level, transmit power level, precoder etc.) to the served UE 230 that allow the AP 220 to decode the resulting uplink transmission of the served UE 230. The AP 220 may then isolate the decoded uplink transmission of the served UE 230 from a received signal (e.g., an uplink transmission from the UE 240) using an interference cancellation technique. To increase the probability that the uplink transmission propagating over the radio interface 232 will be correctly decoded at the AP 220, the controller 225 may reduce the MCS level, increase the transmit power, and/or assign an uplink precoder that creates constructive interference at the spatial location of the AP 220.

In yet other embodiments, the controller 225 may schedule the uplink transmission of the served UE 230 in accordance with a multi-point reception scheme. In such embodiments, the uplink transmission may be jointly received and decoded by the APs, 210, 220. The resulting decoded signals may then be forwarded over the backhaul network connections 201, 202 to the gateway 205, where the decoded signals may be combined.

Figure 3:
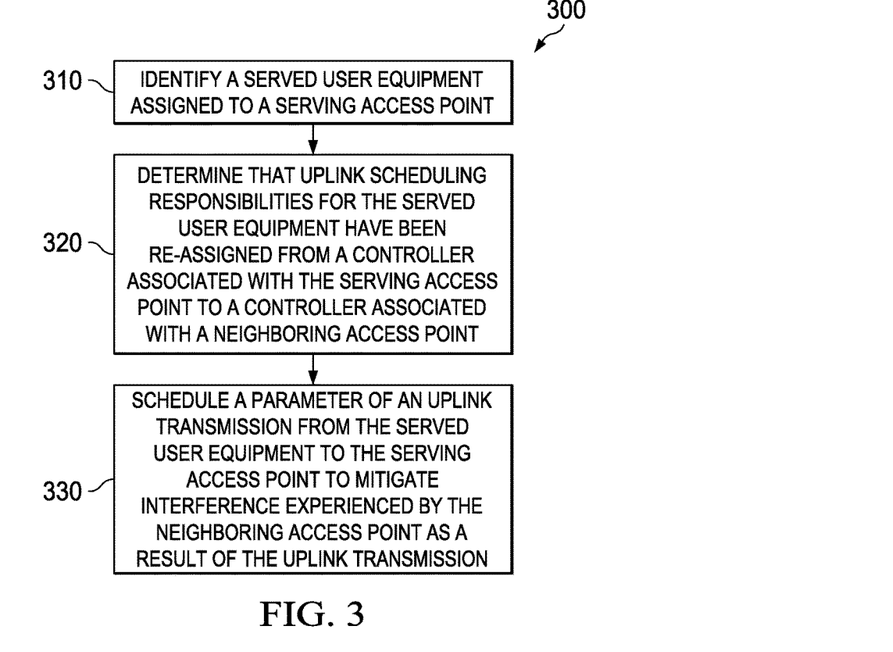
FIG. 3 illustrates a flow chart of an embodiment method for offloading scheduling responsibilities.

FIG. 3 illustrates a flow chart of an embodiment method 300 for offloading scheduling responsibilities, as may be performed by a controller associated with a neighboring AP. As shown, the method 300 begins at step 310, where the controller identifies a served UE assigned to a serving AP. Subsequently, the method 300 proceeds to step 320, where the second controller determines that at least a portion of uplink scheduling responsibilities for the served UE have been re-assigned from a controller associated with the serving AP to a controller associated with the neighboring AP. Finally, the method 300 proceeds to step 330, where the controller associated with the neighboring AP schedules a parameter of an uplink transmission from the served UE to the serving AP. The controller may schedule the parameter using channel information received from the neighboring AP and/or other information (e.g., buffer sizes, AP loading, QoS demands, etc.) to mitigate interference experienced by the neighboring AP as a result of the uplink transmission. The channel information may indicate a characteristic (e.g., path loss, received signal power, etc.) obtained from a previous transmission of the served UE that was received by the neighboring AP, e.g., uplink transmission, sounding signal transmission, etc. In some embodiments, the controller uses the channel information to assign an uplink transmission parameter to the served UE that reduces a received signal power of the resulting uplink transmission at the neighboring AP below a threshold, e.g., a 3db threshold or otherwise. For example, the controller may assign a transmit power level that is below a threshold to reduce the received signal power at the neighboring AP. As another example, the controller may assign a precoder that produces destructive interference at a spatial location of the neighboring AP. In other embodiments, the controller uses the channel information to assign an uplink transmission parameter to the served UE that produces a successful decoding probability of the resulting uplink transmission at the neighboring AP exceeds a threshold, e.g., ninety percent, etc. For example, the controller may assign a transmit power level that is above a threshold to increase the received signal power at the neighboring AP. As another example, the controller may assign a precoder that produces constructive interference at a spatial location of the neighboring AP. As yet another example, the controller may assign an MCS level that is below a threshold to reduce the complexity of decoding, e.g., to reduce the level of reception quality needed to properly decode the signal. This may allow the neighboring AP to isolate the uplink transmission from received signals in accordance with an interference cancellation technique, thereby mitigating interference.

Figure 4:
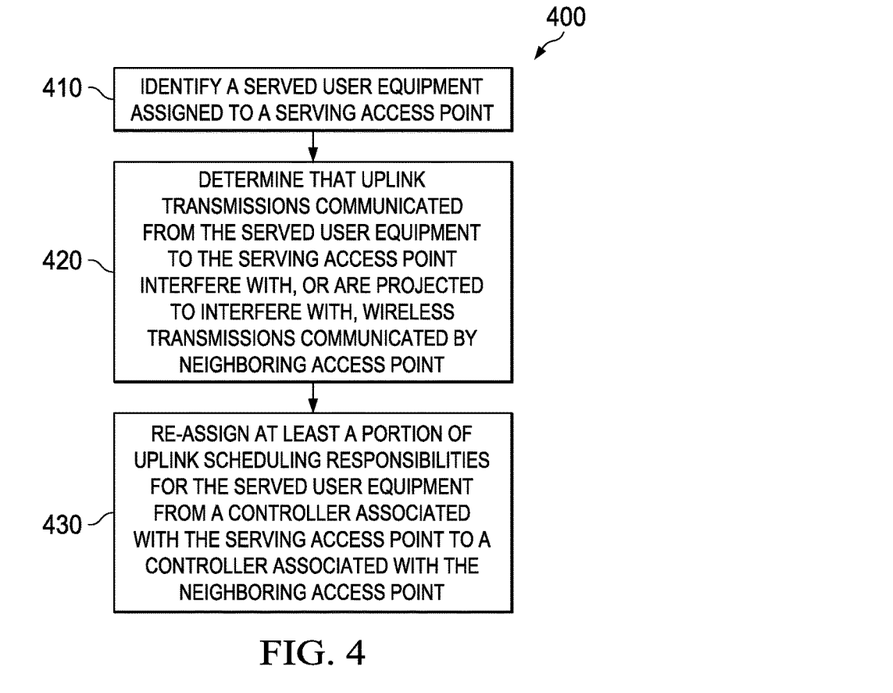
FIG. 4 illustrates a flow chart of an embodiment method for re-assigning scheduling responsibilities.

FIG. 4 illustrates a flow chart of an embodiment method 400 for re-assigning scheduling responsibilities, as may be performed by a network device, e.g., a controller, a gateway, an independent scheduling re-assignment agent, etc. As shown, the method 400 begins at step 410, where the network device identifies a served UE that is assigned to a serving AP. Subsequently, the method 400 proceeds to step 420, where the network device determines that uplink transmissions communicated from the served UE to the serving AP interfere with, or are projected to interfere with, wireless transmissions communicated by a neighboring AP. Finally, the method 400 proceeds to step 430, where the network device re-assigns at least a portion of uplink scheduling responsibilities for the served UE from a controller associated with the serving AP to a controller associated with the neighboring AP.

Figure 5:
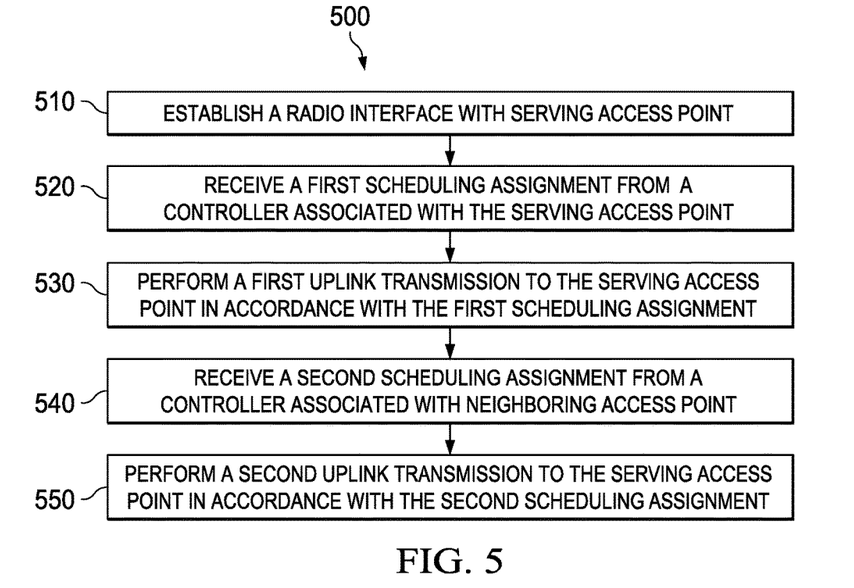
FIG. 5 illustrates a flow chart of an embodiment method for performing uplink transmissions after the re-assignment of scheduling responsibilities.

FIG. 5 illustrates a flow chart of an embodiment method 500 for performing uplink transmissions after the re-assignment of scheduling responsibilities, as might be performed by a served UE. As shown, the method 500 begins at step 510, where the served UE establishes a radio interface with a serving AP. Next, the method 500 proceeds to step 520, where the served UE receives a first scheduling assignment from a controller associated with the serving AP. Subsequently, the method 500 proceeds to step 530, where the served UE performs uplink transmissions to the serving AP over the radio interface in accordance with the first scheduling assignment. Thereafter, the method 500 proceeds to step 540, where the served UE receives a second scheduling assignment from a controller associated with a neighboring AP. Finally, the method 500 proceeds to step 550, where the served UE performs uplink transmissions to the serving AP over the radio interface in accordance with the second scheduling assignment.

Figure 6:
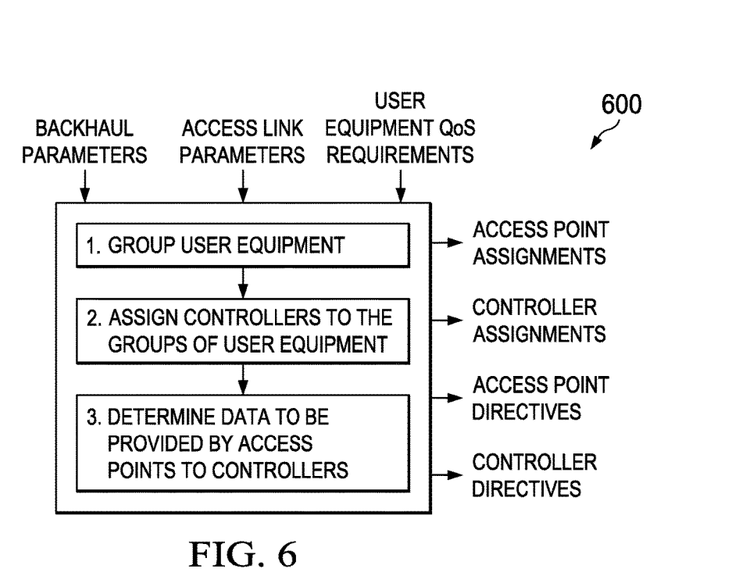
FIG. 6 illustrates a diagram of an embodiment co-coordination function.

FIG. 6 illustrates a diagram of an embodiment co-coordination function 600. As shown, the embodiment co-coordination function 600 considers backhaul parameters, access link parameters, and UE quality of service requirements when determining whether to re-assign scheduling responsibilities. In an embodiment, the co-ordination function 600 identifies UEs that produce the most interference, and arranges them into groups. The co-ordination function may then assign controllers to the groups of UEs, and determine which information the APs must push to which controllers. The information may include channel state information (CSI), mean spectral efficiency (SE) information, maximum MCS levels, resource block masks, long term signal-to-noise (SNR) ratios between the UE and an AP, precoders, power parameters, power masks, and resource restrictions (e.g., resource block (RB) restrictions), etc. Resource restrictions may include a defined set or range of resources to be used for reducing inter-cell interference coordination (ICIC) purposes. The information may also include a time stamp so that the receiving controller can understand how old the information is. If the information is deemed outdated, then the device may take steps to obtain more accurate/up-to-date information, e.g., requesting updated information, performing channel estimation, etc. The information can be sent in a handover, or when a receiver detects a triggering event (e.g., a change in link quality, a spike in interference, etc.), or when a mobility predictor determines that it is time for an update.

In some embodiments, the assignment/re-assignment of scheduling responsibilities may be performed by a co-coordination entity. The co-coordination entity may be located at a controller, an access point, or some third party device, e.g., a central controller. The co-coordination function may consider various criteria when determining whether to transfer scheduling responsibility from one controller to another.

The co-coordination function 600 may then notify network devices (e.g., controllers, APs, etc.) of the serving AP assignments, the controller assignments, access point directives, and controller directives. The access point directives may notify the AP of which information needs to be provided to which APs. The controller directives may indicate scheduling policies to be used for certain UEs and/or groups of UEs. The co-coordination function 600 may re-assign scheduling responsibilities in a variety of ways. In one example, the co-coordination function 600 notifies one or more of the controllers that the scheduling responsibilities have been re-assigned.

Figure 7:
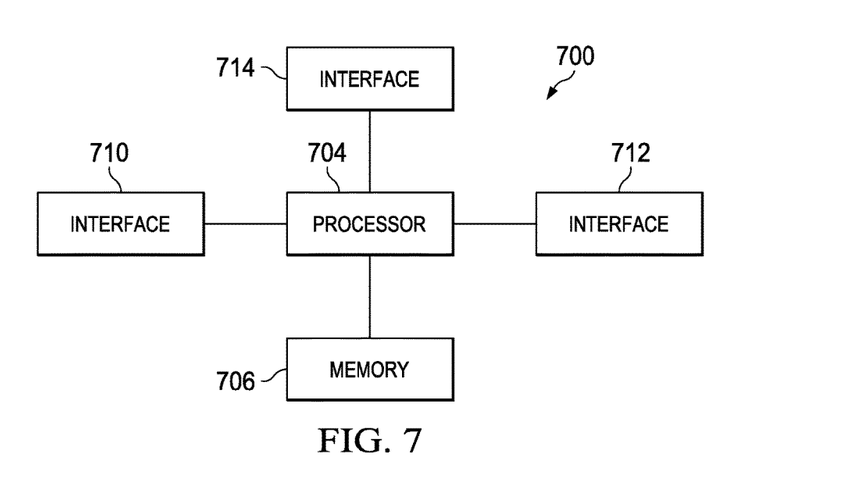
FIG. 7 illustrates a diagram of an embodiment communications device.

FIG. 7 illustrates a block diagram of an embodiment communications device 700, which may be equivalent to one or more devices (e.g., requesting devices, candidate devices, network nodes, etc.) discussed above. The communications device 700 may include a processor 704, a memory 706, and a plurality of interfaces 710, 712, 714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710, 712, 714 may be any component or collection of components that allows the communications device 700 to communicate with other devices, and may include wireless interfaces and/or wireline interfaces for communicating over radio interfaces, backhaul interfaces, control channels, etc.

Figure 8:
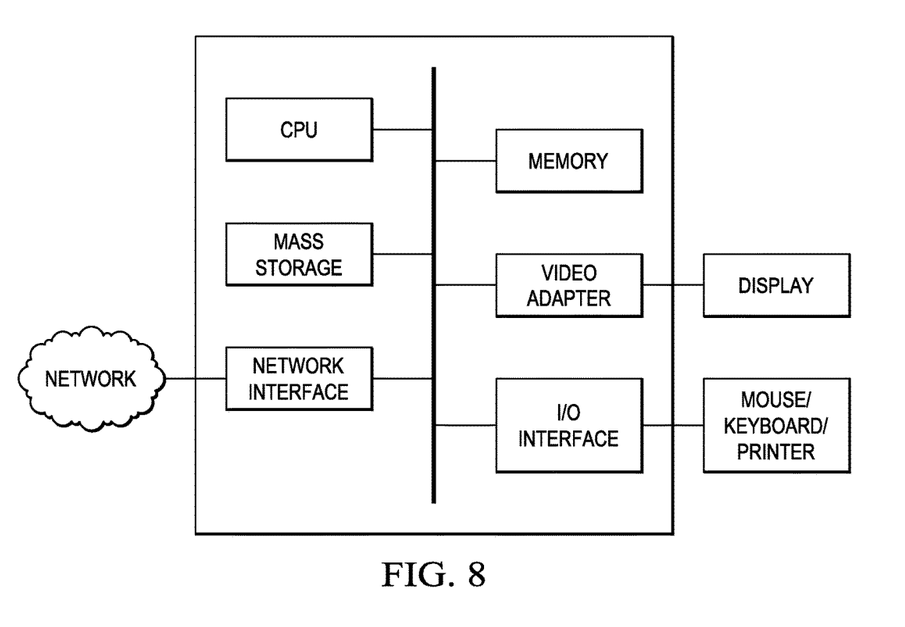
FIG. 8 illustrates a diagram of an embodiment computing platform.

FIG. 8 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for offloading scheduling responsibilities, the method comprising:
   identifying, by a second controller associated with a neighboring access point (AP), a served user equipment (UE) assigned to a serving AP;
   obtaining, by the second controller, an indication that at least a portion of uplink scheduling responsibilities for the served UE have been re-assigned from a first controller associated with the serving AP to the second controller associated with the neighboring AP; and
   scheduling, by the second controller, at least one uplink transmission parameter of an uplink transmission from the served UE to the serving AP after the portion of uplink scheduling responsibilities are re-assigned to the second controller, wherein the uplink transmission parameter is independently scheduled by the second controller without the first controller participating in scheduling of the uplink transmission parameter, and wherein the neighboring AP is incapable of decoding the uplink transmission of the served UE.

2. The method of claim 1, wherein uplink transmissions from the served UE to the serving AP interfere with, or are projected to interfere with, wireless signals communicated by a neighboring AP.

3. The method of claim 2, wherein scheduling the at least one uplink transmission parameter of the uplink transmission from the served UE to the serving AP comprises:
   scheduling the at least one uplink transmission parameter of the uplink transmission from the served UE to the serving AP to mitigate interference experienced by the neighboring AP as a result of the uplink transmission.

4. The method of claim 1, wherein scheduling the at least one uplink transmission parameter of the uplink transmission from the served UE to the serving AP comprises:
   scheduling the uplink transmission over different time-frequency resources than uplink signals received by the neighboring AP.

5. The method of claim 4, wherein scheduling the at least one uplink transmission parameter of the uplink transmission from the served UE to the serving AP comprises:
   scheduling the uplink transmission over time-frequency resources carrying downlink signals communicated by the neighboring AP to remotely located UEs, the remotely located UEs being located at least a threshold distance from the served UE.

6. The method of claim 1, wherein scheduling the at least one uplink transmission parameter of the uplink transmission from the served UE to the serving AP comprises:
   receiving, by the second controller, channel information from the neighboring AP, the channel information corresponding to a signal previously transmitted by the served UE; and
   scheduling, by the second controller, the at least one uplink transmission parameter of the uplink transmission in accordance with the channel information.

7. The method of claim 6, wherein scheduling the at least one uplink transmission parameter of the uplink transmission in accordance with the channel information comprises:
   assigning a transmit power level of the uplink transmission in accordance with the channel information such that a received signal power of the uplink transmission at the neighboring AP is less than a threshold.

8. The method of claim 6, wherein scheduling the at least one uplink transmission parameter of the uplink transmission in accordance with the channel information comprises:
   scheduling a precoder of the uplink transmission in accordance with the channel information.

9. The method of claim 8, wherein the precoder is configured to produce destructive interference at a spatial location of the neighboring AP such that a received signal power of the uplink transmission at the neighboring AP is less than a threshold.

10. The method of claim 1, wherein uplink transmissions from the served UE to the serving AP interfere with, or are projected to interfere with, uplink signals received by the neighboring AP.

11. The method of claim 1, wherein uplink transmissions from the served UE to the serving AP interfere with, or are projected to interfere with, downlink signals transmitted by the neighboring AP.

12. The method of claim 1, further comprising:
   prompting, by the second controller, the neighboring AP to signal a scheduling grant to the served UE, the scheduling grant indicating scheduling information for the uplink transmission.

13. A second controller associated with a neighboring access point (AP), the second controller comprising:
   a processor; and
   a non-transitory computer readable storage medium storing programming for execution by the processor, the programming including instructions to:
      identify a served user equipment (UE) assigned to a serving AP;

obtain an indication that at least a portion of uplink scheduling responsibilities for the served UE have been re-assigned from a first controller associated with the serving AP to the second controller associated with the neighboring AP; and schedule at least one uplink transmission parameter of an uplink transmission from the served UE to the serving AP after the portion of uplink scheduling responsibilities are re-assigned to the second controller, wherein the uplink transmission parameter is independently scheduled by the second controller without the first controller participating in scheduling of the uplink transmission parameter, and wherein the neighboring AP is incapable of decoding the uplink transmission of the served UE.

14. The second controller of claim 13, wherein the instructions to schedule the at least one uplink transmission parameter of an uplink transmission from the served UE to the serving AP include instructions to:

schedule the uplink transmission over different time-frequency resources than uplink signals received by the neighboring AP.

15. The second controller of claim 13, wherein the instructions to schedule the at least one uplink transmission parameter of an uplink transmission from the served UE to the serving AP include instructions to:

receive channel information from the neighboring AP, the channel information corresponding to a signal previously transmitted by the served UE; and schedule the at least one uplink transmission parameter of the uplink transmission in accordance with the channel information, wherein the at least one uplink transmission parameter comprises at least one of a transmit power level and a precoder.

16. The second controller of claim 15, wherein the instructions to scheduling the at least one uplink transmission parameter of the uplink transmission in accordance with the channel information includes instructions to:

assign a transmit power level of the uplink transmission in accordance with the channel information such that a received signal power of the uplink transmission at the neighboring AP is less than a threshold.

17. A method for uplink communications, the method comprising:

receiving, by a served user equipment (UE), a first scheduling assignment from a first controller;

performing, by the served UE, a first uplink transmission over a radio interface between the served UE and a serving access point (AP) in accordance with the first scheduling assignment during a first period, the first controller being associated with the serving AP;

receiving, by the served UE, at least one uplink transmission parameter from a second controller, the second controller being associated with a neighboring AP, wherein the at least one uplink transmission parameter is independently scheduled by the second controller without the first controller participating in scheduling of the at least one uplink transmission parameter; and performing, by the UE, a second uplink transmission over the radio interface in accordance with the at least one uplink transmission parameter during a second period, the second uplink transmission being received at least by the serving AP, wherein the neighboring AP is incapable of decoding uplink transmissions of the served UE.

18. A served user equipment (UE) comprising:

a processor; and a non-transitory computer readable storage medium storing programming for execution by the processor, the programming including instructions to:

receive a first scheduling assignment from a first controller;

perform a first uplink transmission to over a radio interface between the served UE and a serving access point (AP) in accordance with the first scheduling assignment during a first period, the first controller being associated with the serving AP;

receive at least one uplink transmission parameter from a second controller, the second controller being associated with a neighboring AP, wherein the at least one uplink transmission parameter is independently scheduled by the second controller without the first controller participating in scheduling of the at least one uplink transmission parameter; and perform a second uplink transmission over the radio interface in accordance with the at least one uplink transmission parameter during a second period, the second uplink transmission being received at least by the serving AP, wherein the neighboring AP is incapable of decoding uplink transmissions of the served UE.

19. The served UE of claim 18, wherein the at least one uplink transmission parameter specifies an uplink resource for carrying the second uplink transmission.

20. The served UE of claim 18, wherein the at least one uplink transmission parameter specifies a transmit power level for the second uplink transmission.

21. The served UE of claim 18, wherein the at least one uplink transmission parameter specifies a precoder for the second uplink transmission.

22. The method of claim 17, wherein the at least one uplink transmission parameter specifies a transmit power level for the second uplink transmission.

* * * * *